R. M. WARWICK.
BAG TYING MACHINE.
APPLICATION FILED APR. 7, 1919.

1,373,470.

Patented Apr. 5, 1921.
8 SHEETS—SHEET 1.

Fig. 1.

Witness:
Inventor.
Rogers M. Warwick

UNITED STATES PATENT OFFICE.

ROGERS M. WARWICK, OF CHICAGO, ILLINOIS, ASSIGNOR TO GENERAL WIRE TIE CO., OF CHICAGO, ILLINOIS, A CORPORATION OF ILLINOIS.

BAG-TYING MACHINE.

1,373,470. Specification of Letters Patent. Patented Apr. 5, 1921.

Application filed April 7, 1919. Serial No. 288,424.

*To all whom it may concern:*

Be it known that I, ROGERS M. WARWICK, a citizen of the United States, residing at Chicago, in the county of Cook and State of Illinois, have invented certain new and useful Improvements in Bag-Tying Machines; and I do hereby declare the following to be a full, clear, and exact description of the invention, such as will enable others skilled in the art to which it appertains to make and use the same.

This invention relates to improvements in machines for tying bags with wire and which is adaptable with such changes in construction as mechanical skill can readily devise for tying other objects with wire.

The present invention relates more particularly to certain specific improvements in construction of machines of this character described and claimed in Letters Patent issued to me, No. 1,293,267, dated February 4, 1919.

The principal object of the present invention is to provide a novel mechanism for bringing bags or other objects to be tied successively in position with respect to the wire-feeding and tying means to permit the same to be successively tied, and resides more particularly in means whereby such carriage is given intermittent movement which is free from jerks and jars tending to increase the normal wear and tear thereon.

A further object is to provide means whereby the relation of the object-engaging elements and wire-tie forming means may be adjusted relatively to the other parts of the machine to insure proper coöperation between the several parts to perform the desired functions.

Other objects of the invention will be fully understood from the following specification.

The invention consists in the features of construction and combinations of parts hereinafter fully described and particularly claimed.

In the accompanying drawings illustrating a suitable embodiment of the invention.

Figure 11:
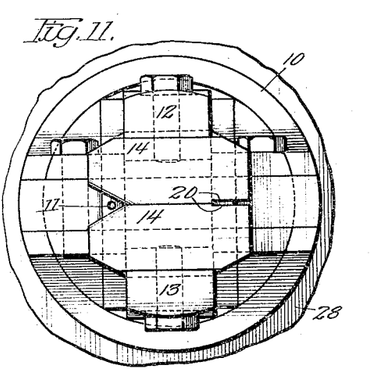
Fig. 11 is a view in front elevation of the same.
Figure 12:
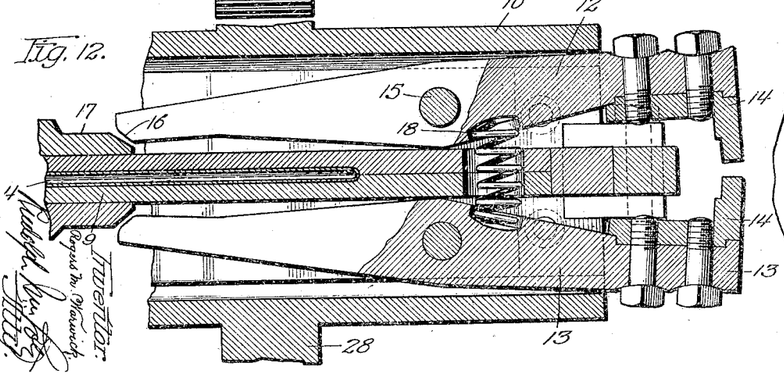
Fig. 12 is a vertical longitudinal section on the line 12—12 of Fig. 13 showing the wire clamping jaws open.
Figure 13:
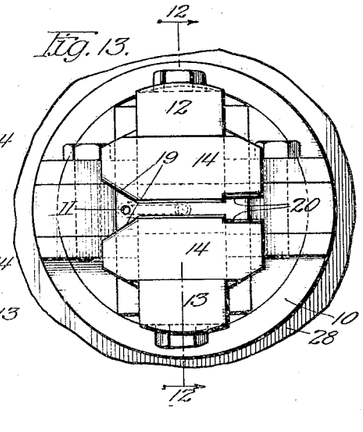
Fig. 13 is a view similar to Fig. 11 showing the wire clamping jaws in their open position.

The machine comprises a suitable supporting frame which includes a flat plate or table 1 upon which a large part of the mechanism is supported. The latter includes mechanism for engaging wire and feeding predetermined lengths thereof longitudinally. The said mechanism, which is not novel and forms no part of the present invention, is fully illustrated and described in the aforesaid patent and comprises tubular guides 2, 3 and 4 through which the wire passes successively. Between the tubes 3 and 4 is an open space wherein the wire passes into engagement with two segmental feeding elements 5 which are mounted upon the upper faces of intermeshing spur gears 6 and 7. The opposed faces of said segments 5 are nurled or otherwise roughened to enable the same to firmly engage the wire and prevent slippage. The gear 6 is mounted upon a sliding support movable in suitable guides, particular illustration of which is omitted, and by means of a spring 8 is held in mesh with the gear 7 so that the wire will be firmly engaged between the segments 5. It will be noted that during each revolution of the gears 6 and 7 the wire will be fed longitudinally a distance equal to the arcuate lengths of the segments 5. The tube 4, the inner end of which is shown in Fig. 12, enters the central member 9 of a twisting head which includes the tubular housing 10 in which the central member 9 is rigidly mounted and extends diametrically of the said housing 10. It is here shown as composed in part of two members bored to receive the tube 4 which delivers the end of the wire into an angular extension of its bore to project it from the mouth 11 (shown in Figs. 11 and 13). Pivotally mounted within the housing 10 on opposite sides of the element 9, are two levers 12 and 13 which project at one end from the housing 10 and are equipped at their projecting ends with wire clamping heads 14. The pins 15 on which said levers are pivotally mounted, pass through openings therein between the ends thereof. At their other ends said jaws are provided with opposed tapered faces 16 adapted to be engaged by the spreading cam or wedge 17 which is reciprocably mounted on the element 9 and is adapted to effect closure of the clamping heads 14 to engage wire as will be hereinafter more particularly described. A helical compression spring 18 passing through an opening in element 9 and engaged at opposite ends with the jaws 12 and 13, serves to maintain clamping heads 14 normally separated, as shown in Figs. 12 and 13.

The clamping heads 14 are provided at one side with opposed inclined surfaces 19 forming a V-shaped recess, when said heads are brought together, through which wire passes when projected from the opening 11. At their opposite edge portions said clamping heads are cut away to provide a recess 20 which, when the jaws are open as shown in Fig. 13, is adapted to receive the free end of the projected wire after it has been passed about the object to be tied, as will be hereinafter more particularly described, and wherein, upon closure of the heads 14 as shown in Fig. 11, the said free end of the wire is firmly clamped and held during the retracting and twisting operations, also hereinafter described.

Figure 2:
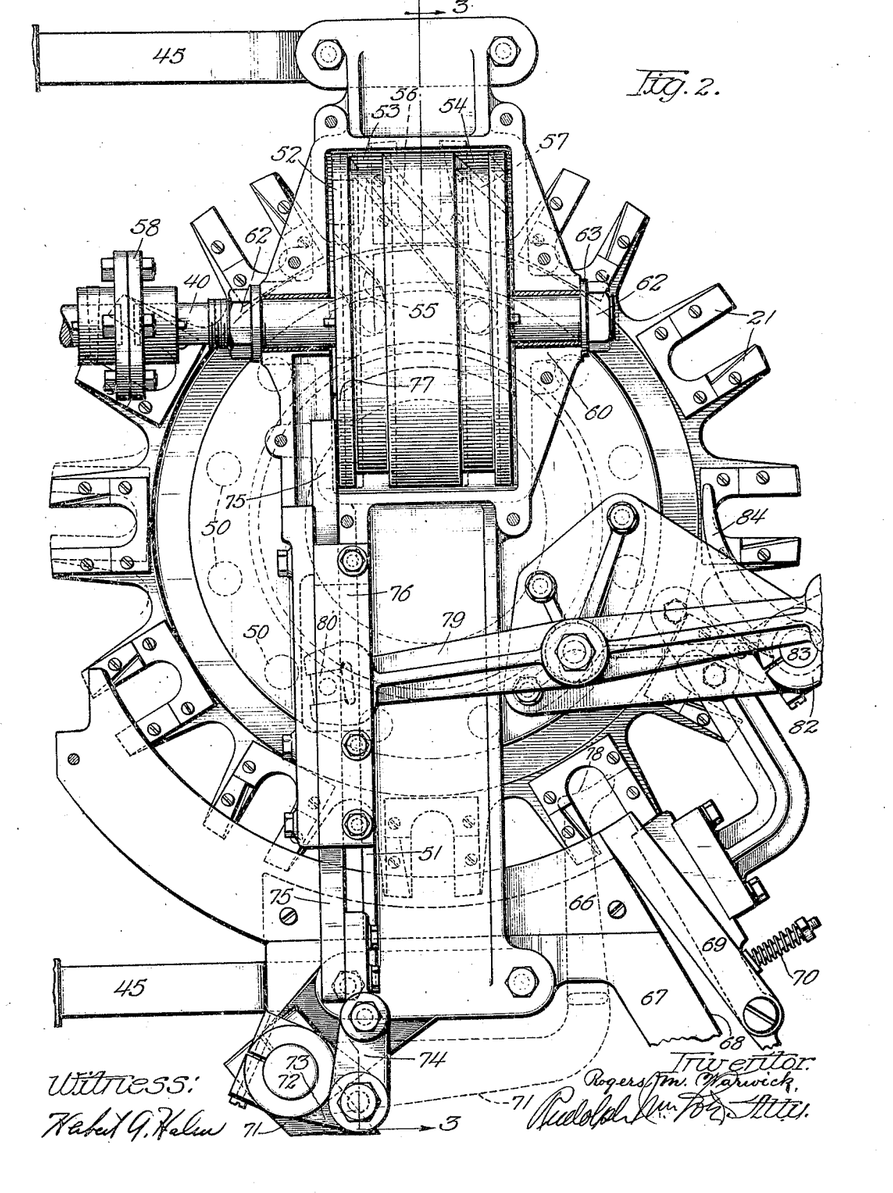
Fig. 2 is a fragmentary detail top plan view on an enlarged scale showing the object-carrying device and a part of the mechanism for actuating the same.

The wire feeding mechanism hereinbefore described coacts with the wire looping elements 21 on the carrier 22. The latter consists of a circular horizontally disposed rotatable element equipped on its periphery at regular intervals with the said wire guides or loop forming devices 21 which are U-shaped. These are constructed as shown in some detail in Fig. 2, but more particularly as shown and described in the aforesaid patent. Particular illustration and description of the same is, therefore, omitted from this specification. The said plate 22 is rotated at regular intervals through an arc equal to the distance separating contiguous guides or forming devices 21 from each other, to bring the latter successively into such position relatively to the bore 11 as to cause wire projected from the latter to enter a guide or forming device 21 at one side and pass thence about the object to be tied, engaged in the recess of said forming device 21, whereupon it is caused by the latter to be projected into the recess 20 whereupon the jaws 14 close and engage the free end of the wire preparatory to twisting the U-shaped loop thus formed to contract the same about the object and thus tie the latter. This operation is identical with that described in the aforesaid Letters Patent and, except as I have particularly described, the mechanism for effecting such operation is identical with that therein illustrated and described.

Figure 5:
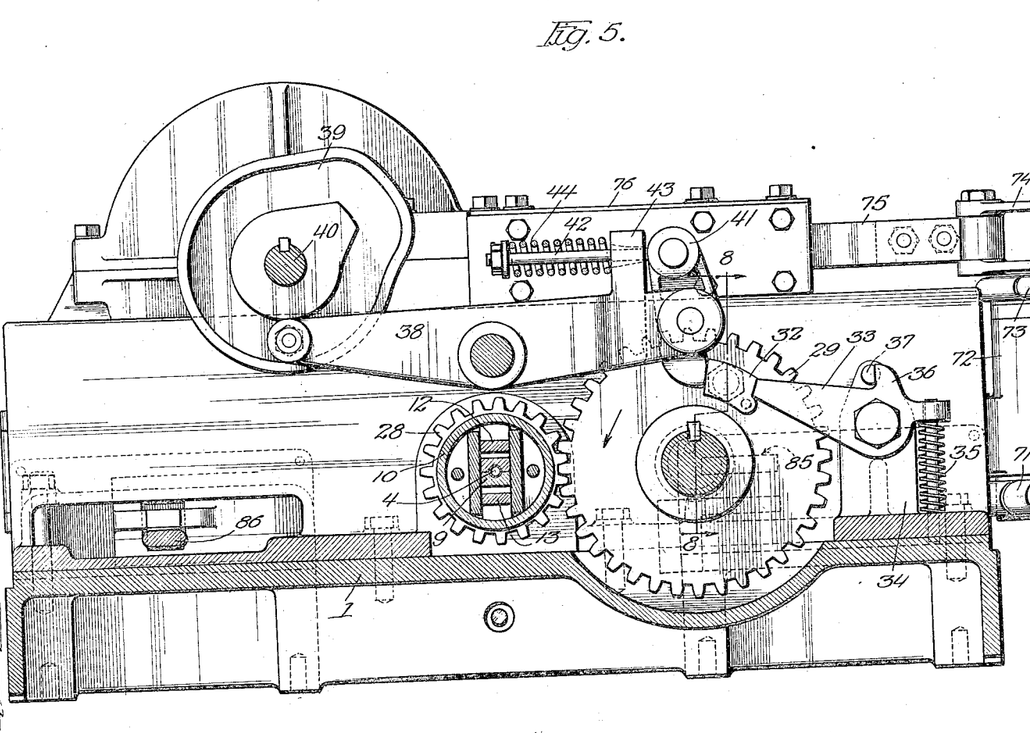
Fig. 5 is a detail vertical transverse section on the line 5—5 of Fig. 4.
Figure 6:
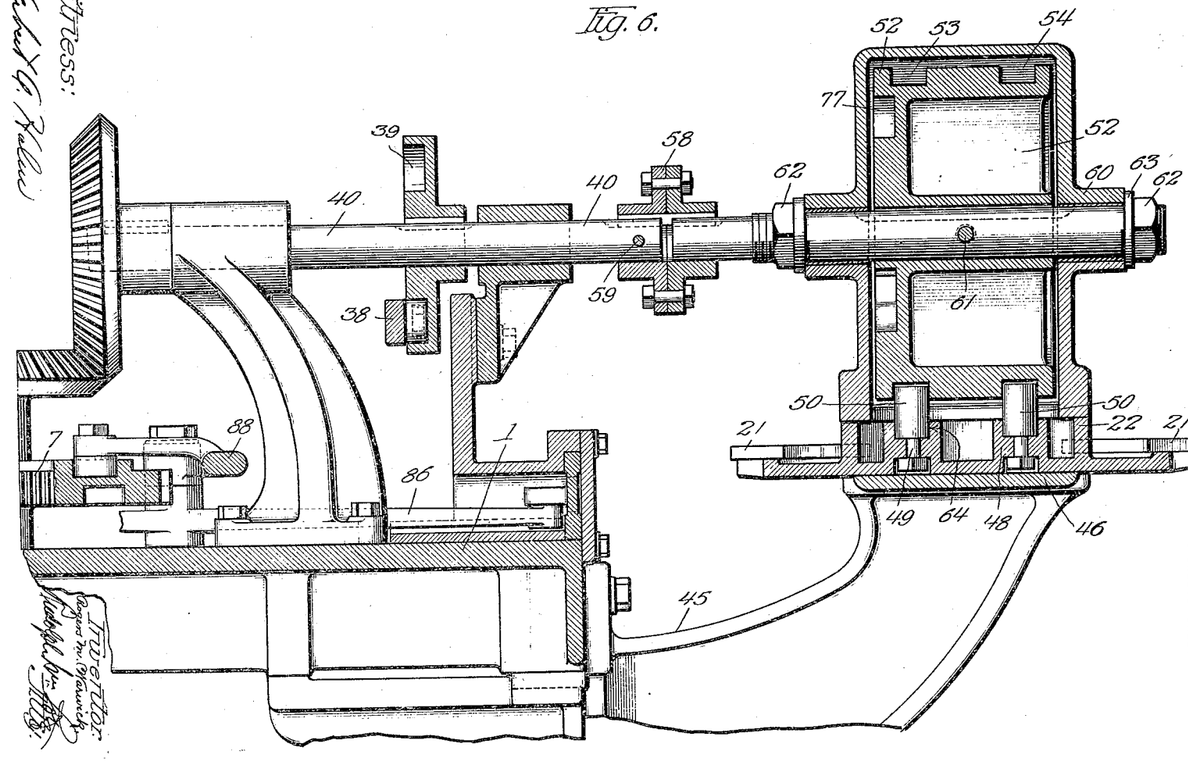
Fig. 6 is a detail vertical longitudinal section on the line 6—6 of Fig. 1.
Figures 7, 8, 9:
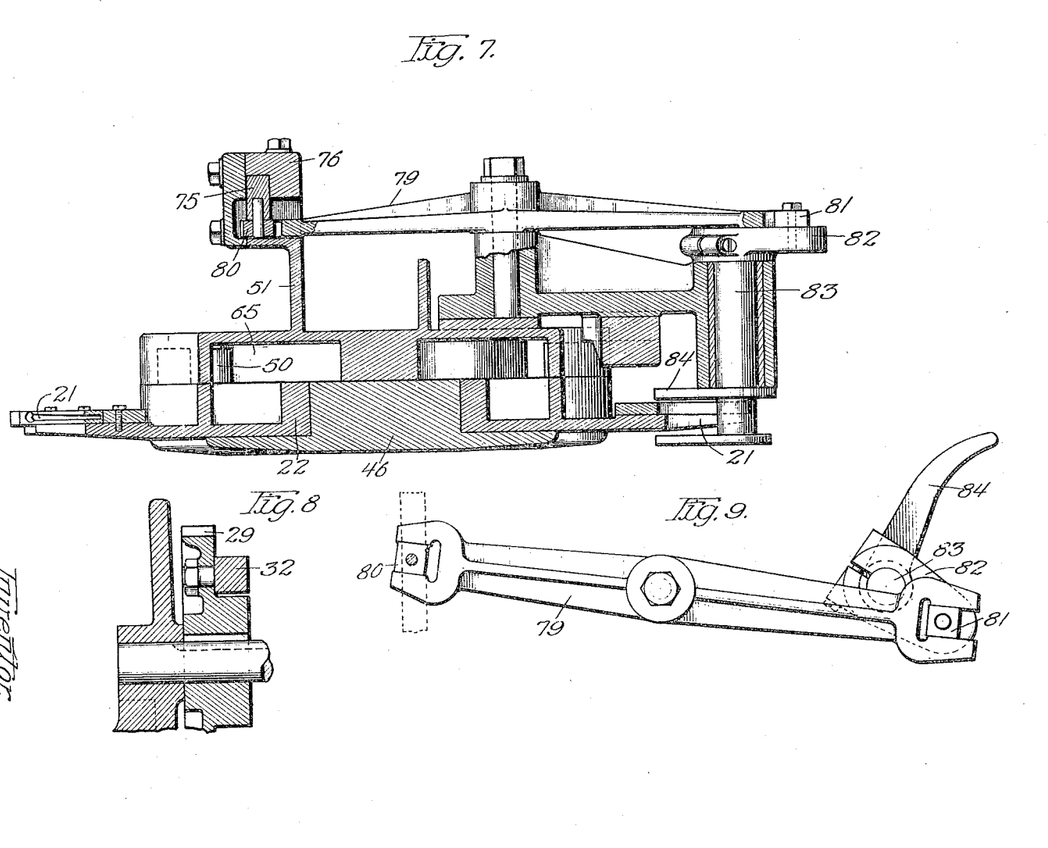
Fig. 7 is a detail vertical section on the line 7—7 of Fig. 1.
Fig. 8 is a detail vertical section on the line 8—8 of Fig. 5.
Fig. 9 is a fragmentary detail plan view of a bag or object ejecting mechanism associated with the carrier.
Figure 10:
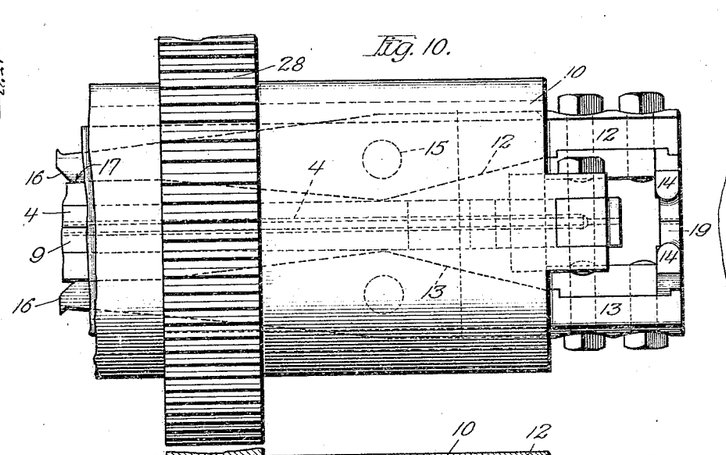
Fig. 10 is a fragmentary detail top plan view of the wire feeding and tying head employed.

After the free end of the wire has been engaged in the recess 20 by closure of the jaws 14, a portion of the wire fed by means of the segments 5 is retracted by means of the oscillating segments 23 carried by the segmental gears 24 and 25 which intermesh. The gear 25 carries an arm 26 which is normally disposed in the path of a projection 27 mounted on the gear 6 and which strikes the arm 26 to effect an oscillating movement of the gear segments and the wire engaging segments 23 for forcibly retracting a portion of the wire theretofore fed forward by the segments 5 and during a period of freedom of engagement of the wire from said segments 5. This serves to tighten the loop of wire about the object to be tied preparatory to effecting the twisting operation hereinbefore referred to. The twisting operation is effected as follows:

Integral or rigid with the casing 10 of the twisting head is a spur gear 28 which meshes with a spur gear 29 on a counter shaft suitably mounted in the bearings supported on the table 1 and which carries a bevel gear 30 at one end. The latter is disposed in the path of the segmental bevel gear 31 rigid with the spur gear 6 and which is adapted to engage and mesh with the pinion 30 once during each revolution of the gear 6 and serves to rotate said gear 29 and twisting head 10 a predetermined number of revolutions (preferably two) thereby causing the ends of the wire (which constitutes the loop about the object to be tied) to be twisted about each other. This part of the mechanism is more particularly shown in Fig. 5 wherein the spur gear 29 is shown to be provided with a stop element 32 which is engaged at one side by one end of a dog 33 pivotally mounted between its ends on a projection 34 of the frame and which is normally held in the path of the element 32 by means of the compression spring 35 which also holds the projection 36 in engagement with the stop 37 on the projection 34. The inclined lower face of the dog 33 is engaged by the element 32 as the gear 29 rotates, thus serving to lift said end of the dog 33 to permit the element 32 to pass the same whereupon the spring returns it to the normal position shown in Fig. 5. There is also associated with the gear 29 a rocking lever 38 pivotally supported between its ends and engaged at one end, by means of an antifriction roller, with the groove of the cam 39 which is mounted on the main shaft 40 of the machine. At its other end, said lever 38 carries a pivotally supported dog 41, one end portion of which is adapted to project into the path of the element 32 at intervals determined by the cam 39 to prevent further rotation of said gear 29. At its other end said dog 41 is pivotally engaged with one end of the plunger 42 which projects through an opening in the arm or projection 43 of the lever 38 and is engaged in an obvious manner with a compression spring 44 which serves to normally hold the dog 41 in a predetermined position. The said spring 44 serves as a buffer or cushion to absorb the shock incident to the striking of the lower end of the dog 41 by the element 32, thus permitting the gear 29 to rotate a very slight distance beyond its normal position and causes it to be then forced back and firmly held between the lower end of the dog 41 and the opposed end of the dog 33. Thus it will be seen that after each revolution of the gear 29 the twisting mechanism will be returned to a predetermined position with respect to the horizontal plane of the wire looping means to properly repeat the operations hereinbefore described. This stop mechanism constitutes an important feature of the present invention.

Figure 3:
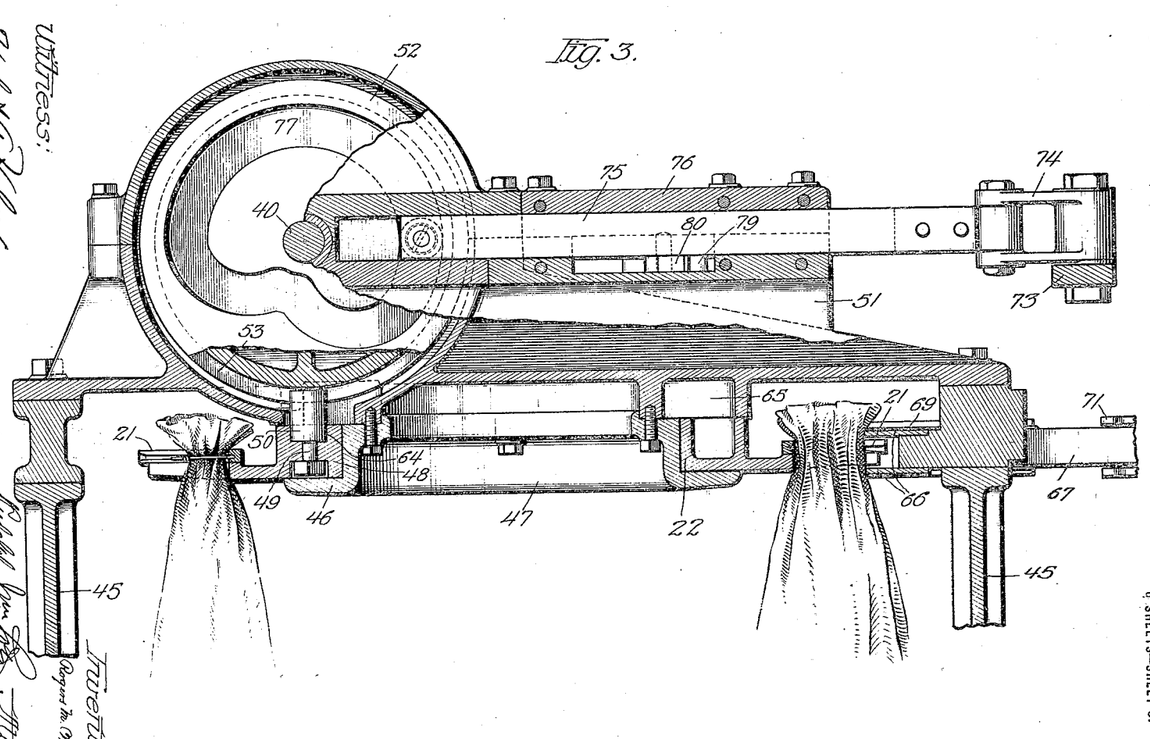
Fig. 3 is a detail vertical longitudinal section on the line 3—3 of Fig. 2.
Figure 4:
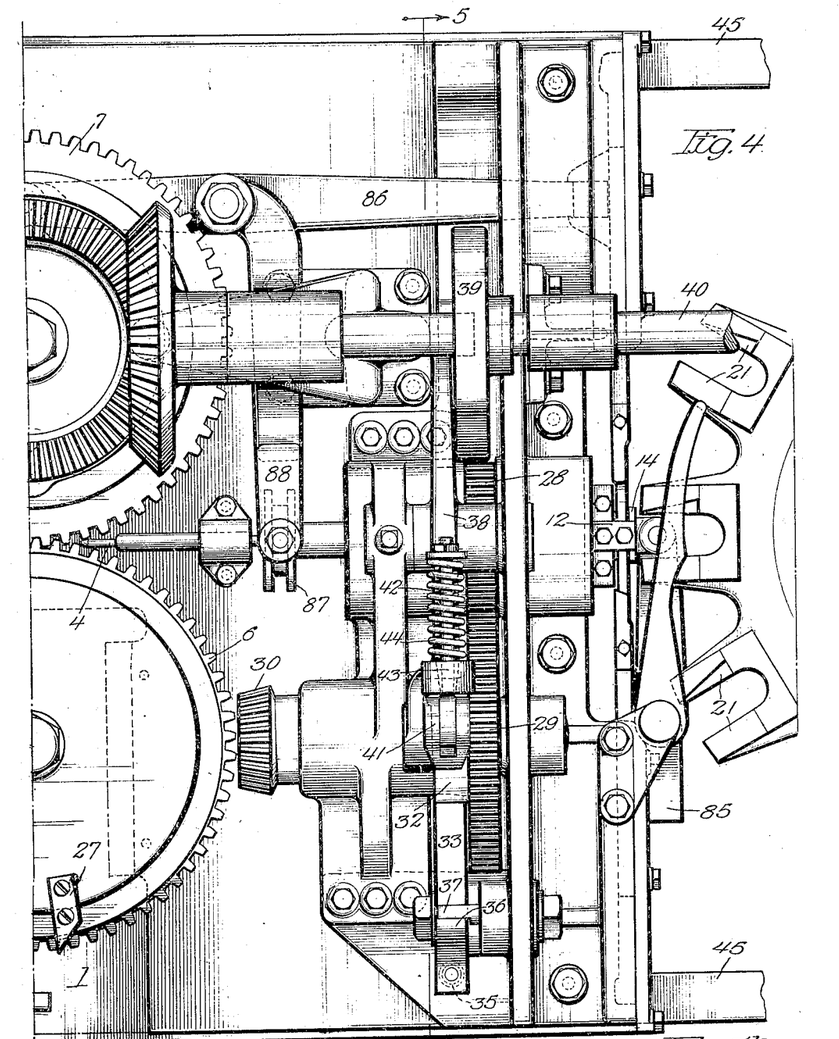
Fig. 4 is a fragmentary detail top plan view of that part of the machine which feeds the wire to the carrier and subsequently fastens it about the bag or other object to be tied.

Projecting from the front edge of the table 1 and parallel with opposite side edges thereof, are two arms 45 upon the outer ends of which the plate 22 and the mechanism for operating the same are suitably mounted and supported. The supporting means includes a bridge plate 46 spanning the outer ends of said arms 45 which is provided midway between its ends with a central vertically extending trunnion or pivot formation 47 on which the element 22 rotates on a vertical axis as shown in Fig. 3. The said plate 22 is thus of practically spiderlike formation consisting mainly of a heavy ring 48 carrying vertically projecting pins 50, there being one of said pins for each of the wire forming devices 21 and located in staggered relation to the latter. Secured to the said plate carrying the pivot member 46 and also mounted at its ends upon the outer ends of the arms 45 is a casting 51 which houses the cam 52 mounted on the shaft 40. The latter consists of a drum having parallel cam grooves 53 and 54 in its circumferential face. The groove 53 is provided (as shown in the dotted lines in Fig. 2) with an angular or what might be termed helical part or terminal 55, and the groove 54 has a similar terminal 56 which connects it with the groove 53. The last-named terminal 56 may be said to constitute one end of the groove 54 which at its other end terminates in a similar part 57. This cam or drum 52 rotates continuously and the respective grooves 53 and 54 engage two of the pins 50 on the carriage or plate 22 and serves to move the latter through an arc equal to that separating two of said pins 50 during each revolution of said drum and, in the interval between such movement, serves to hold the plate or carriage 22 rigidly in position during a period in which the wire is fed through one of the guides or forming devices 21 to form the loop about the bag or other object and tie the same. Each of the pins 50 first enters the groove 54 through the extension or terminal portion 57 thereof, and during one revolution or substantially one revolution of the drum, travels in the groove 54 and then passes through the helical portion 56 into the groove 53 at the same time that the next succeeding pin 50 enters the groove 54. During the next revolution of the drum, the said pin 50 travels in the groove 53 and leaves the same through the terminal portion 55 thereof at the same time that the third pin enters the terminal 57 of the groove 54. The intermittent movement of the carriage is thus rendered very smooth and free from jerks or jars as will be apparent.

The said drum 52 is adjustable in the direction of the axis of the shaft 40 which, it will be noted, consists of two parts coupled to rotate in unison by means of the coupling 58, one member of which is keyed and also fastened by means of a pin 59 to one part of said shaft and is keyed only to that part which carries the said drum. This last-named part of the shaft is slidable in the coupling 58 so that it may be moved longitudinally relatively to its companion member. The said last-named portion of the shaft is journaled in the bearings 60 in the housing for the drum 52 and said housing is, as previously pointed out, rigid with the casting 51 rigidly mounted upon the arms 45. The drum 52 is keyed and also secured by means of a pin 61 to this portion of the shaft. The latter is slightly annularly enlarged at that end which carries the drum and the enlarged portion is threaded at its ends to receive the nuts 62 between which and the bearings 60, washers 63 are interposed. By means of the nuts 62, the said portion of the shaft carrying said drum may be moved longitudinally relative to said bearings whereby to effect such slight adjustment of the drum 52 with respect to the carriage 22 and the wire tying mechanism as to cause the loop forming devices 21 to be adjusted relatively to the latter to insure proper coöperation therewith to form the loops of wire about the objects to be tied. Obviously, a very limited latitude of adjustment is sufficient. This means of adjustment also constitutes an important feature of the invention.

It will also be noted that the pins 50 extend partially into an annular groove 64 in the heavy ring portion 48 of the carriage 22, said groove being continuous and communicating at its upper end with a similar groove 65 in the casting 51, said grooves terminating in the housing for the drum 52. The said groove 64 is filled with grease which serves not only to lubricate the pins 50, but serves also to prevent the entry of dust into said grooves and the housing for the drum 52, thus greatly reducing wear and tear on said parts.

Figure 1:
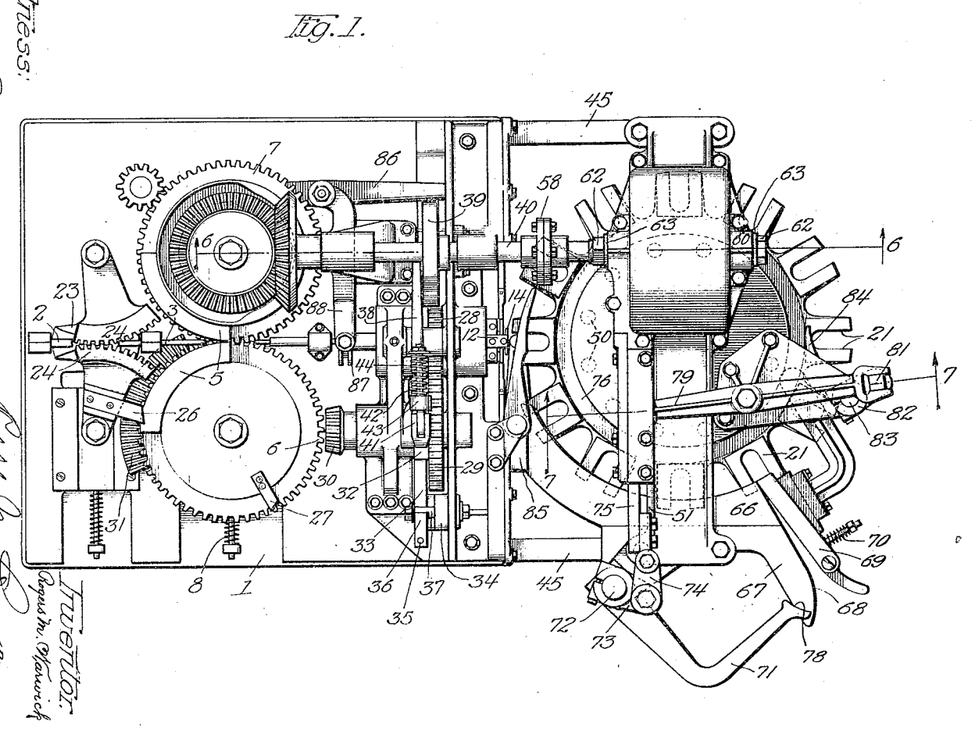
Figure 1 is a top plan view of a machine for tying objects with wire constructed in accordance with the invention.

Associated with the carriage 22 and the wire forming devices are means for feeding objects to be tied successively to the U-shaped recesses of said forming devices 21 and for ejecting tied bags or objects therefrom. These means are shown in Fig. 1 as comprising an arcuate casting or cam formation 66 suitably rigidly mounted on the machine frame and having its inner edge partly overhanging the wire forming devices of the carriage. The said casting 66 and the companion element 67 present a substantially radially disposed edge 68 forming one side of what might be termed a chute through which the bags or objects to be tied are fed into the grooves of the wire forming devices 21. Opposing the edge 68 is a lever 69 pivotally mounted between its ends on a suitable element of the machine frame and which is engaged in an obvious manner by the spring 70 to hold its inner end normally in contact with the inner end of the opposed edge 68. The outer end of the latter and the outer end of the lever 69 present diverging convex faces which provide a flaring mouth for the chute.

Associated with the chute is a feeding device which consists of an L-shaped lever 71 pivotally mounted on a stud shaft 72 journaled in a bracket of the frame and which is connected by means of an arm 73 and link 74 with a reciprocable plunger 75 longitudinally movable in a guide 76 formed in the casting 51 and which communicates with the housing for the drum 52. The latter is provided in a side face thereof, with a cam groove 77 in which an anti-friction roller at the inner end of the plunger 75 engages, said cam being substantially heart-shaped for imparting longitudinal movement to the plunger 75 during a given interval in each rotation of the drum 52 thereby obviously rapidly rocking the arm 71 to cause the shoe 78 at the free end thereof to move through an arc passing through the path of travel of the object to be tied and which engages said object to cause the same to pass from a point contiguous to the flaring mouth of the chute into the recess of the guide 21 opposed to the inner or delivery end of said chute. The bags or other objects are inserted by hand into the chute so as to become disposed substantially opposite the spring 70 from which point the same are moved successively by the shoe 78 into the wire forming device 21. At the same time that one of the bags or other objects is fed to the carriage another one which has been tied is ejected. This is effected by means of the mechanism more clearly shown in Fig. 2 and comprises a rocking lever 79 having opposite bifurcated ends, one of which receives a rectangular element 80 pivotally mounted on a pin carried by the plunger 75. The other end of said lever 79 receives a similar element 81 pivotally mounted on a pin rigid with the arm 82 mounted on the stud shaft 83 suitably journaled in a bearing of the machine frame and which carries a curved arm 84 which is normally positioned so that the inner ends of the recesses of the wire forming devices 21 describe an arc intersecting that of the outer face of the arm 84. Said arm is further so positioned that the wire forming devices attain a position of rest successively so that the arm 84 partially spans the inner end of such recess and, when swung on the axis of the shaft 84 as a center, will move toward and beyond the mouth of the recess thereby obviously ejecting the bag or other object carried in said recess. Said arm is positioned, of course, to normally engage a portion or portions of the bag or other object disposed above the plane of the top face of the wire forming devices.

As will be apparent from the foregoing description, the bags or other objects are successively brought in position with respect to the wire feeding and twisting mechanism to be successively tied. It frequently happens, however, in the feeding of the machine that one or more of the recesses for receiving and engaging the bags or other objects, pass into this position empty of bags and in that event, it is, of course, desirable that the wire feeding and tying mechanism shall remain inactive to save wire and also prevent possible clogging of the mechanism by loose wires or ties formed. To this end there is disposed in the path of the objects carried in the wire forming devices 21, a rocking lever 85 which, when disposed as shown in Fig. 1, serves, by reason of connection with the carrier for the stud shaft of the gear 6, to hold the segment 5 which is rigid with said gear, out of engaging relation to the wire to be fed forward. This connection is effected by means of a rod and other mechanism which forms no part of the present invention, but is fully described and illustrated in the aforesaid Letters Patent, being modified only to the extent that the clamping heads 14 in the present machine are modified. This mechanism comprises laterally reciprocating elements which are operatively connected with the rocking lever 86 pivotally supported between its ends and engaged at one end with a curved cam on the lower face or below the gear 7, said plunger serving not only to cut the tie from the main portion of the wire, but also to bend the opposite ends of the tie so that they are opposed to each other. This cam is common to the said laterally reciprocating plunger and also the cam or wedge 17 for effecting a closure of the jaws 14 to engage the free end of the wire loop which has been passed about the object to be tied. The said wedge 17 is rigid with an annularly grooved element 87 longitudinally movable on the member 9 and which is engaged by an arm 88 rigid with the lever 86. This mechanism also forms no part of the present invention but is fully illustrated and described in the aforesaid Letters Patent.

The operation of the machine will be readily understood from the foregoing specification.

While I have shown the preferred embodiment of the invention in the accompanying drawings, it will be understood, of course, that changes in details may be effected to adapt the machine to the needs of any desired industry without departing from the invention as defined in the appended claims.

I claim as my invention:

1. In a machine of the kind specified, the combination with mechanism for forming a loop of wire about an object to be tied, of means for tying said loop comprising a rotatable element equipped with means for engaging the ends of the wire loop, gearing for effecting rotation of said head through a predetermined number of revolutions, and stop mechanism associated with said gearing including a projection on one of the gear elements, a spring-held dog normally positioned in the path of travel of said projection for holding the same against movement in one direction, and means associated with said gearing including a rocking lever and a spring-held projection carried thereby adapted to be moved into the path of travel of said projection at regular intervals for preventing movement thereof in the other direction, said last-named projection normally bearing upon the first-named projection to hold the same engaged with said dog.

2. In a machine of the kind specified, the combination with mechanism for forming a loop of wire about an object to be tied, of means for tying said loop comprising a rotatable element equipped with means for engaging the ends of the wire loop, gearing for effecting rotation of said head through a predetermined number of revolutions, and stop mechanism associated with said gearing including a projection on a rotatable part of said mechanism, spring-held means normally disposed in the path of travel of said projection for preventing rotation thereof in one direction, and power actuated means associated with said spring-held means and adapted to enter the path of travel of said projection at predetermined intervals for preventing rotation of said projection in the other direction, said power-actuated means including a rocking lever and a spring normally holding the same in a predetermined position, said lever adapted to be struck by said projection and moved against the action of said spring as said projection is carried by momentum beyond a predetermined point in its rotation, said spring adapted to react to throw said projection into contact with said spring-held means and there hold the same.

3. In a machine of the kind specified, the combination with a guide for bending wire to form an open loop about an object, and mechanism for projecting wire through said guide, of means for tying the loop comprising a pair of opposed rotatable heads having opposed inclined side edges adapted when said heads are moved into contact with each other to present a V-shaped recess through which one end of the loop is adapted to extend, wire-clamping formations at the opposite side of said head for firmly engaging the other end of the loop, means for rotating said heads to twist the ends of the loop about each other, means for cutting the tied loop from a body of wire, means coacting with said clamping heads for bending the free ends of the tied loop to oppose each other, and means for separating said heads to release the tied loop.

4. In a machine of the kind specified, the combination with mechanism for passing wire successively about objects to be tied and securing said wire about said objects, a carriage constituting a part of said mechanism and a plurality of object-engaging elements on said carriage, of means for imparting intermittent movement to said carriage to bring the objects carried thereby successively to a predetermined position, comprising a shaft adapted to continuously rotate, a plurality of cam formations rigid with said shaft and parallel with each other, each thereof having a main portion disposed in a plane perpendicular to the shaft, and opposite helical end portions, said main portions being connected by a helical portion consituting the terminus of one of the main portions and the beginning of the other thereof, and formations on said carriage adapted to be successively engaged by said cam formations for moving the carriage during intervals of engagement of said formations of said carriage with said helical portions and maintaining said carriage immovable during engagement of said carriage with said main portions of said cam formations.

5. In a machine of the kind specified, the combination with mechanism for passing wire successively about objects to be tied and securing said wire about said objects, a carriage constituting a part of said mechanism and a plurality of object-engaging elements on said carriage, of means for imparting intermittent movement to said carriage to bring the objects carried thereby successively to a predetermined position, comprising a shaft adapted to continuously rotate, a drum rigid with said shaft, coacting formations on said carriage and said drum for imparting movement to said carriage at intervals, said formations including a pair of parallel cam elements on the circumferential face of said drum, each comprising a main portion disposed in a plane perpendicular to the axis of said drum and opposite helical end portions, one of said helical end portions constituting the terminus of one cam formation and the beginning of the other thereof, said helical portions adapted to succesively engage the formations on said carriage for imparting movement thereto, each of the last-named formations being adapted to be successively engaged alternately by a helical and a main portion of the several cam formations.

6. In a machine of the kind specified, the combination with mechanism for passing wire successively about objects to be tied and securing said wire about said objects, a carriage constituting a part of said mechanism and a plurality of object-engaging elements on said carriage, of means for imparting intermittent movement to said carriage to bring the objects carried thereby successively to a predetermined position comprising a shaft adapted to continuously rotate, a drum rigid with said shaft, a pair of parallel cam-grooves in the circumferential face of said drum, each ending in helical portions through which projections on the carriage are adapted to pass into and through said cam grooves for alternately moving and holding stationary the said carriage, and projections on the carriage for engaging in said cam-grooves of said drum.

7. In a machine of the kind specified, the combination with mechanism for passing wire successively about objects to be tied and securing said wire about said objects, a carriage constituting a part of said mechanism and a plurality of object-engaging elements on said carriage, of means for imparting intermittent movement to said carriage to bring the objects carried thereby successively to a predetermined position including a shaft adapted to continuously rotate and consisting of two parts adjustable longitudinally relatively to each other, means for preventing relative rotation of said parts, a drum carried by one of said parts of said shaft, bearings for the latter, and means on the same for engaging said bearings to hold said part of said shaft in a predetermined position relatively to the carriage, said drum and said carriage equipped with coacting formations for imparting intermittent movement to said carriage during rotation of said drum, substantially as and for the purpose specified.

8. In a machine of the kind specified, the combination with a rigid element, mechanism thereon for projecting a predetermined length of wire longitudinally for permitting a loop thereof to be formed, and mechanism for tying said loop, of a carriage movable relatively to said rigid element, a plurality of object-engaging elements mounted on said carriage, a guide element associated with each object-engaging element and adapted to coact with said wire-projecting and loop-tying mechanisms to form loops of wire about the objects succesively, mechanism for imparting intermittent movement to said carriage for bringing the object-engaging and guide elements successively into proper position relatively to the wire projecting mechanism, and means associated with said carriage-actuating mechanism for adjusting said carriage relatively to said rigid element to effect proper positioning of said guide elements relatively to said wire-projecting mechanism.

ROGERS M. WARWICK.